United States Patent Office 3,427,315
Patented Feb. 11, 1969

3,427,315
PROCESS FOR PREPARING PURINE DERIVATIVES
Hiroaki Nomura, Nishinomiya, and Keiichi Sugimoto and Norihiro Uno, Suita, Japan, assignors to Takeda Chemical Industries, Ltd., Osaka, Japan
No Drawing. Filed Nov. 16, 1965, Ser. No. 508,141
Claims priority, application Japan, Nov. 17, 1964, 39/65,106
U.S. Cl. 260—252    8 Claims
Int. Cl. C07d 57/40

ABSTRACT OF THE DISCLOSURE

A process for preparing adenine or hypoxanthine wherein free formamidine is reacted in a non-aqueous solvent in the presence of ammonia with an α-amino-α-cyanoacetic acid derivative of the formula

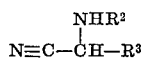

wherein $R^2$ is hydrogen, formyl, acetyl or propionyl, and $R^3$ is lower alkoxycarbonyl or carbamoyl.

---

This invention relates to a new advantageous process for preparing purine derivatives of the formula

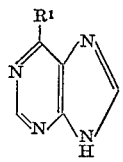

wherein $R^1$ is an amino group or a hydroxyl group.

Although many processes for synthesizing adenine or hypoxanthine have been tried and presented, most of them are industrially of no value due to, for example, the use of expensive starting material or materials, unavoidably low yields, or too many reaction steps required for the purpose.

Processes for the production of adenine or hypoxanthine which are intended for industrial exploitation are those which are described in: the Japanese patent publication No. 22,891/1963 and the Journal of the American Chemical Society, pages 3144–3166, vol. 82 (1960).

However, these processes are not entirely satisfactory for industrial purposes because they require the use of ethyl orthoformate which is rather expensive as an industrial starting material and because constantly good yields are not realized in these known processes.

The present invention is primarily directed at overcoming the deficiencies of these prior processes, and this objective is successfully realized by producing the purine derivatives of Formula I by reacting formamidine, in a non-aqueous solvent in the presence of ammonia, with α-amino-α-cyanoacetic acid derivative of the formula

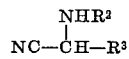

wherein $R^2$ is a hydrogen atom or a carboxylic acyl group having up to two carbon atoms, and $R^3$ is an alkoxycarbonyl, a carbamoyl or a cyano group.

The success of the process depends upon the new findings that in the reaction formamidine, which is usually available only in the form of an acid addition salt, keeps its state of acid addition salt because the $pK_b$ of formamidine is lower (i.e. a stronger base) than that of ammonia, and that the purine derivatives of the Formula I can be produced with far better yields when free formamidine is present in place of its acid addition salt.

The principal object of this invention is to provide a novel and improved process for producing purine derivatives of the Formula I with good yields and at a low cost.

In the method of this invention, an α-amino-α-cyanoacetic acid derivative of the Formula II is reacted with formamidine in the free form in a non-aqueous solvent in the presence of ammonia.

In the Formula II, $R^3$ is a lower alkoxycarbonyl or carbamoyl group when $R^1$ is a hydroxyl group, and $R^3$ is a cyano group when $R^1$ is an amino group. The carboxylic acyl represented by $R^2$ is formyl or acetyl. The alkoxycarbonyl represented by $R^3$ may, for example, be methoxycarbonyl or ethoxycarbonyl. The non-aqueous solvent employed in this invention is, for example, formamide, dimethylformamide, alcohols (e.g. methanol, ethanol, isopropanol, ethylene glycol monomethyl ether, etc.), benzene or toluene.

Formamidine is practically available as an acid addition salt thereof, such as hydrochloride, hydrogen acetate, etc. As it is essential in this invention to react α-amino-α-cyanoacetic acid derivative of the Formula II with formamidine in the free form, it is convenient to carry out the method of this invention by use of the acid addition salt of formamidine together with a basic substance (e.g. sodium methoxide, potassium ethoxide, sodium hydroxide, potassium hydroxide, etc.) of which the $pK_b$ is not higher than that of formamidine.

The reaction of the present invention preferably proceeds at a temperature between about 100° C. and about 200° C. The preferable molar ratio of formamidine to α-amino-α-cyanoacetic acid derivative of Formula II employed is from about 2 to about 4.

Following are presently preferred illustrative embodiment of this invention. In these examples, the parts by weight bear the same relationship to parts by volume as do grams to milliliters.

Example 1

10.0 parts by weight of ethyl acetoaminocyanoacetate, 14.3 parts by weight of formamidine hydrochloride and 10.0 parts by weight of liquid ammonia are added to sodium ethoxide solution prepared by dissolving 4.1 parts by weight of metallic sodium in 70 parts by volume of absolute ethanol. The reaction mixture is heated at 120–130° C. for 20 hours in an autoclave. After the reaction is completed, the resulting solid is collected by filtration. The reddish-brown filtrate is neutralized with dilute hydrochloric acid and then concentrated to give crystals. The crystals are collected, washed with a small amount of ethanol, and combined with the solid collected above, followed by addition of activated charcoal. The mixture is dissolved in hot water and filtered while hot and the filtrate is kept standing to give 7.0 parts by weight of fine powdery crystals melting at above 300° C. This product is identical with authentic hypoxanthine in ultraviolet absorption spectrum, thin layer chromatography and elementary analysis.

Example 2

25.0 parts by weight of acetoaminomalononitrile, 49.0 parts by weight of formamidine hydrochloride and 24.0 parts by weight of liquid ammonia are added to sodium exthoxide solution prepared by dissolving 14.0 parts by weight of metallic sodium in 200 parts by volume of absolute ethanol. The reaction mixture is heated at 120–130° C. under agitation for 25 hours in an autoclave. After the reaction is completed, the resulting solid is collected by filtration. The filtrate is neutralized with dilute hydrochloric acid and then concentrated to give crystals. The resulting crystals are combined with the solid collected above, followed by addition of activated charcoal. The mixture is dissolved in hot water and filtered while hot and the filtrate is kept standing to give 18.3 parts by weight of white crystals. The crystals are identical with authentic adenine in ultraviolet absorption spectrum, thin layer chromatography and elementary analysis.

Example 3

8.3 parts by weight of acetoaminocyanoacetoamide, 14.3 parts by weight of formamidine hydrochloride and 10.0 parts by weight of liquid ammonia are added to sodium ethoxide solution prepared by dissolving 4.1 parts by weight of metallic sodium in 80 parts by volume of absolute ethanol. The mixture is heated at 135–145° C. under agitation for 10 hours in autoclave.

After the reaction is completed, the resulting solid is collected by filtration and washed with water. The filtrate is neutralized with diluted hydrochloric acid and concentrated to give crystals. The crystals are collected solid, followed by addition of activated charcoal. The mixture is dissolved in hot water and filtered while hot and the filtrate is kept standing to give 6.1 parts by weight of white powdery crystals. The crystals are identical with authentic hypoxanthine in ultraviolet absorption spectrum, thin layer chromatography and elementary analysis.

Example 4

13.8 parts by weight of ethyl formaminocyanoacetate, 21.5 parts by weight of formamidine hydrochloride and 15.0 parts by weight of liquid ammonia are added to sodium ethoxide solution prepared by dissolving 6.2 parts by weight of metallic sodium in 150 parts by volume of absolute ethanol. The mixture is heated at 140° C. for 8 hours. After the reaction is completed, the resulting solid is collected by filtration and washed with water until the washing is free from alkalinity. The washing is combined with the previously obtained filtrate. The combined solution is neutralized with dilute hydrochloric acid, then concentrated to precipitate crystals. The crystals are collected and combined with the solid before obtained, followed by addition of activated charcoal. The mixture is dissolved in hot water and filtered while hot and the filtrate is kept standing to give 9.4 parts by weight of white powdery crystals. The crystals are identical with authentic hypoxanthine in ultraviolet absorption spectrum, thin layer chromatography and elementary analysis.

What we claim is:

1. A process for preparing purine derivative of the formula

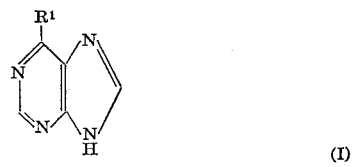   (I)

wherein $R^1$ is a member selected from the group consisting of $NH_2$ and OH, which consists essentially of heating free formamidine, in a non-aqueous solvent in the presence of ammonia, with α-amino-α-cyanoacetic acid derivative of the formula $$NC-\underset{\underset{NHR^2}{|}}{CH}-R^3 \quad\quad (II)$$

wherein $R^2$ is a member selected from the group consisting of H, formyl, acetyl and propionyl, and $R^3$ is a member selected from the group consisting of lower alkoxycarbonyl and carbamoyl when $R^1$ is OH, and $R^3$ is cyano when $R^1$ is amino.

2. A process according to claim 1, wherein the compound of Formula II is ethyl acetoaminocyanoacetate, whereby Compound I is hypoxanthine.

3. A process according to claim 1, wherein the compound of Formula II is acetaminomalononitrile, whereby Compound I is adenine.

4. A process according to claim 1, wherein the compound of Formula II is acetoaminocyanoacetoamide, whereby Compound I is hydoxanthine.

5. A process according to claim 1, wherein the compound of Formula II is ethyl formaminocyanoacetate, whereby Compound I is hypoxanthine.

6. A process for preparing hypoxanthine, which consists essentially of heating free formamidine in a non-aqueous solvent selected from the group consisting of alcohol having 1 to 3 carbon atoms, formamide, dimethylformamide and benzene in the presence of ammonia, with α-amino-α-cyanoacetic acid derivative of the formula $$NC-\underset{\underset{NHR_2}{|}}{CH}-R^3$$

wherein $R^2$ is H, formyl, acetyl or propionyl, and $R^3$ is methoxycarbonyl and ethoxycarbonyl, at a temperature of about 120 to about 145° C., the non-aqueous solvent being used in an amount of about 7 to about 11 times as much by weight as that of the α-amino-α-cyanoacetic acid derivative, and the molar ratio of formamidine to α-amino-α-cyanoacetic acid derivative being from about 2 to about 4.

7. A process according to claim 6, wherein the compound of the said formula is ethyl acetoaminocyanoacetate.

8. A process according to claim 6, wherein the compound of the said formula is ethyl formaminocyanoacetate.

References Cited

Taylor et al.: Purine Chemistry VI, Convenient one-step synthesis of hypoxanthine. Tetrahedrox Letters 1959, No. 12, pp. 9–11.

NICHOLAS S. RIZZO, *Primary Examiner.*

ANNE MARIE TIGHE, *Assistant Examiner.*